(12) United States Patent
Omori (10) Patent No.: US 8,335,398 B2
(45) Date of Patent: Dec. 18, 2012

(54) ZOOM LENS DISTORTION CORRECTING APPARATUS

(75) Inventor: Minoru Omori, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 998 days.

(21) Appl. No.: 12/359,591

(22) Filed: Jan. 26, 2009

(65) Prior Publication Data
US 2009/0190856 A1    Jul. 30, 2009

(30) Foreign Application Priority Data

Jan. 26, 2008   (JP) ................................. 2008-015694

(51) Int. Cl.
*G06K 9/40* (2006.01)
(52) U.S. Cl. ..... 382/275; 382/254; 382/260; 348/222.1; 348/335
(58) Field of Classification Search .................. None
See application file for complete search history.

(56) References Cited

U.S. PATENT DOCUMENTS

| | | | |
|---|---|---|---|
| 5,818,527 A * | 10/1998 | Yamaguchi et al. | 348/335 |
| 7,301,565 B2 * | 11/2007 | Kurase | 348/222.1 |
| 7,424,172 B2 * | 9/2008 | Nose et al. | 382/275 |
| 7,636,498 B2 * | 12/2009 | Furukawa et al. | 382/303 |
| 7,719,597 B2 * | 5/2010 | Okada et al. | 348/335 |
| 7,783,128 B2 * | 8/2010 | Kurata et al. | 382/275 |
| 7,813,585 B2 * | 10/2010 | Higurashi et al. | 382/275 |
| 2002/0164083 A1 * | 11/2002 | Song et al. | 382/275 |
| 2003/0218683 A1 | 11/2003 | Kurase | |
| 2004/0207733 A1 | 10/2004 | Nose et al. | |
| 2006/0110050 A1 | 5/2006 | Aoyama et al. | |
| 2006/0188172 A1 * | 8/2006 | Higurashi et al. | 382/275 |
| 2007/0025636 A1 * | 2/2007 | Furukawa et al. | 382/275 |

FOREIGN PATENT DOCUMENTS

| | | |
|---|---|---|
| JP | 05-236273 A | 9/1993 |
| JP | 05-304603 A | 11/1993 |
| JP | 2003-333588 A | 11/2003 |

(Continued)

OTHER PUBLICATIONS

Machine language translation of Japanese Publication No. 2006-279144 A, translated on Mar. 7, 2012.*

(Continued)

*Primary Examiner* — Matthew Bella
*Assistant Examiner* — Jason Heidemann
(74) *Attorney, Agent, or Firm* — Westerman, Hattori, Daniels & Adrian, LLP (57) ABSTRACT

A distortion correcting apparatus includes a buffer circuit which writes image data having horizontal pixels of a first number and a vertical-distortion different depending on a horizontal pixel position, into an SDRAM. The written image data is read-out for each units of horizontal pixels, which include a reference horizontal pixel and indicates a second number smaller than the first number, in a vertical pixel direction. A buffer control circuit in the vertical-distortion correcting circuit determines a second number in such a manner as to indicate a larger numerical value as a vertical-distortion corresponding to the reference horizontal pixel is smaller so as to start the buffer circuit. Also, the buffer control circuit changes a position of the reference horizontal pixel to a position corresponding to the second number at a timing based on a correction amount of the vertical-distortion correcting circuit so as to start the above-described determining process.

7 Claims, 10 Drawing Sheets

FOREIGN PATENT DOCUMENTS

| | | |
|---|---|---|
| JP | 2004-080545 A | 3/2004 |
| JP | 2004-234379 A | 8/2004 |
| JP | 2006-139350 A | 6/2006 |
| JP | 2006-279144 A | 10/2006 |
| JP | 2007-180898 A | 7/2007 |

OTHER PUBLICATIONS

Japanese Notice of Allowance dated Jan. 5, 2012, issued in corresponding Japanese Patent Application No. 2008-015694.

* cited by examiner

(A) OBJECT SCENE (B) ORIGINAL IMAGE (C) H DISTORTION CORRECTED IMAGE (D) V DISTORTION CORRECTED IMAGE

(A) AREA M1

(B) AREA M2

(C) AREA M3

(D) AREA M4

FIG. 9

(A) BLOCK B1

(B) BLOCK B2

(C) BLOCK B3

(D) BLOCK B4

☐ NOTICED PIXEL
○ PIXEL AFTER INTERPOLATION ARITHMETIC OPERATION
✗ PIXEL BEFORE CORRECTION (✗ INDICATES ORIGINAL PIXEL)

ZOOM LENS DISTORTION CORRECTING APPARATUS

CROSS REFERENCE OF RELATED APPLICATION

The disclosure of Japanese Patent Application No. 2008-15694, which was filed on Jan. 26, 2008 is incorporated herein by reference.

BACKGROUND OF THE INVENTION

1. Field of the Invention

The present invention relates to a distortion correcting apparatus which is particularly applied to a digital camera and corrects a distortion of a photographed object scene image.

2. Description of the Related Art

According to one example of this type of apparatus, image data representing an object scene is firstly subjected to a distortion correction in a horizontal pixel direction by a horizontal-distortion correcting circuit. The image data outputted from the horizontal-distortion correcting circuit is written in a moving image area of an SDRAM. The moving image area is formed by two memory banks, and the image data is written in the two memory banks so that writing banks differ among pixels adjacent in a vertical pixel direction. The image data thus accommodated in the moving image area is thereafter read out in the vertical pixel direction by each horizontal 64 pixels. The read-out image data is subjected to a distortion correction in the vertical pixel direction by a vertical-distortion correcting circuit provided with 48 line memories.

With respect to a distortion in the object scene image, the largest distortion is found at both ends in a length direction and the smallest distortion is found at a center in the length direction both in horizontal and vertical directions. In spite of this, the number of pixels read out from the moving image area for the vertical distortion correction is fixed to 64 pixels. Thus, there is a limit moving image area for the vertical distortion correction is fixed to 64 pixels. Thus, there is a limit to the performance of the vertical distortion correction.

SUMMARY OF THE INVENTION

A distortion correcting apparatus according to the present invention, comprises: a writer for writing image data having horizontal pixels of a first number and a vertical distortion different depending on a horizontal pixel position, into a memory; a reader for reading out the image data accommodated in the memory by the writer for each units of horizontal pixels, which include a reference horizontal pixel and are of a second number smaller than the first number, in a vertical pixel direction; a corrector for performing a vertical distortion correction on the image data read out by the reader; a determiner for determining the second number in such a manner as to indicate a larger numerical value as a vertical distortion corresponding to the reference horizontal pixel is smaller so as to start the reader; and a changer for changing a position of the reference horizontal pixel to a position corresponding to the second number at a timing based on a correction amount of the corrector so as to start the determiner.

Preferably, the corrector includes a temporary memory for temporally holding the image data, and the determiner determines a numerical value indicated by the second number by referring to a capacity of the temporary memory.

Preferably, a designator for designating a plurality of horizontal pixel positions by referring to the reference horizontal pixel; a specifier for specifying a plurality of vertical pixel positions respectively corresponding to the plurality of horizontal pixel positions designated by the designator by referring to the vertical distortion; and a calculator for calculating a data amount of image data belonging to a partial area defined by the plurality of horizontal pixel positions designated by the designator and the plurality of vertical pixel positions specified by the specifier are further comprised, and the determiner determines a numerical value indicated by the second number based on the data amount calculated by the calculator.

More preferably, one of the plurality of horizontal pixel positions corresponds to the reference horizontal pixel, and the designator includes a changer for changing another one of the plurality of horizontal pixel positions when the data amount calculated by the calculator is equal to or less than a threshold value.

In an aspect of the present invention, the determiner deadlines, as the second number, a numerical value equivalent to a gap among the plurality of horizontal pixel positions when the data amount calculated by the calculator exceeds the threshold value.

In another aspect of the present invention, the corrector includes a temporary memory which has a capacity corresponding to the threshold value and which is for temporarily holding the image data.

Preferably, the reader performs a reading-out operation in a burst access manner, and the second number is equivalent to one burst access amount.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
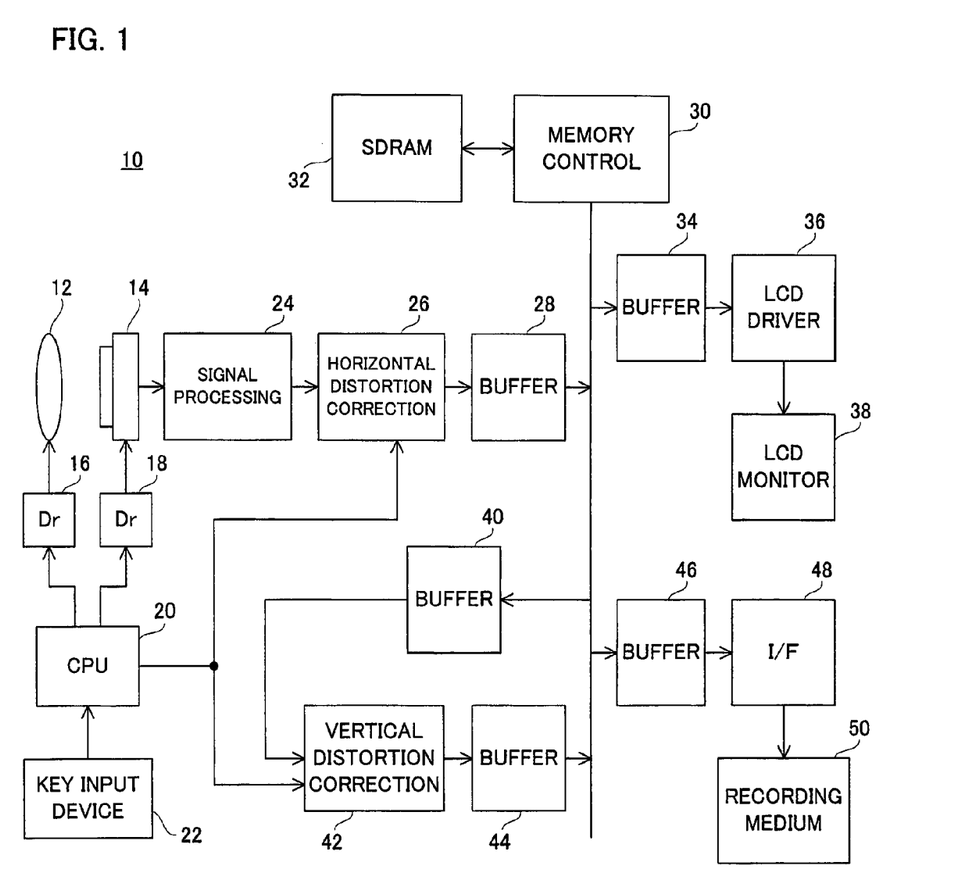
FIG. 1 is a block diagram showing a configuration of one embodiment of the present invention.

With reference to FIG. 1, a digital camera 10 according to this embodiment includes a zoom lens 12. An optical image of an object scene is irradiated onto an image surface of an imaging device 14 via the zoom lens 12. The imaging surface has horizontal 640 pixels×vertical 480 pixels, and is covered with a primary color filter (not shown) having a Bayer array. Electric charges generated in each pixel have any one of color information, i.e., R (Red), G (Green), and B (Blue).

When a power source is turned on, in order to output a real-time moving image (through image) of the object scene from an LCD monitor 38, through-image process is executed. A CPU 20 instructs a driver 18 to repeat an exposure operation and an electric-charge reading-out operation. In response to a vertical synchronization signal Vsync occurring at every 1/30 seconds, the driver 18 exposes the imaging surface and reads out the electric charges generated thereby from the imaging surface in a raster scanning manner. From the imaging device 14, raw image data of horizontal 640 pixels× vertical 480 pixels based on the readout electric charges is outputted at a frame rate of 30 fps.

A signal-processing circuit 24 performs a series of processes, such as a white balance adjustment, a color separation, and a YUV conversion, on the raw image data outputted from the imaging device 14 so as to create image data of horizontal 640 pixels×vertical 480 pixels corresponding to a YUV format. The created image data is applied to a horizontal-distortion correcting circuit 26, and the applied image data is subjected to a horizontal distortion correction in consideration of a zoom factor at a current time point.

Figure 3:
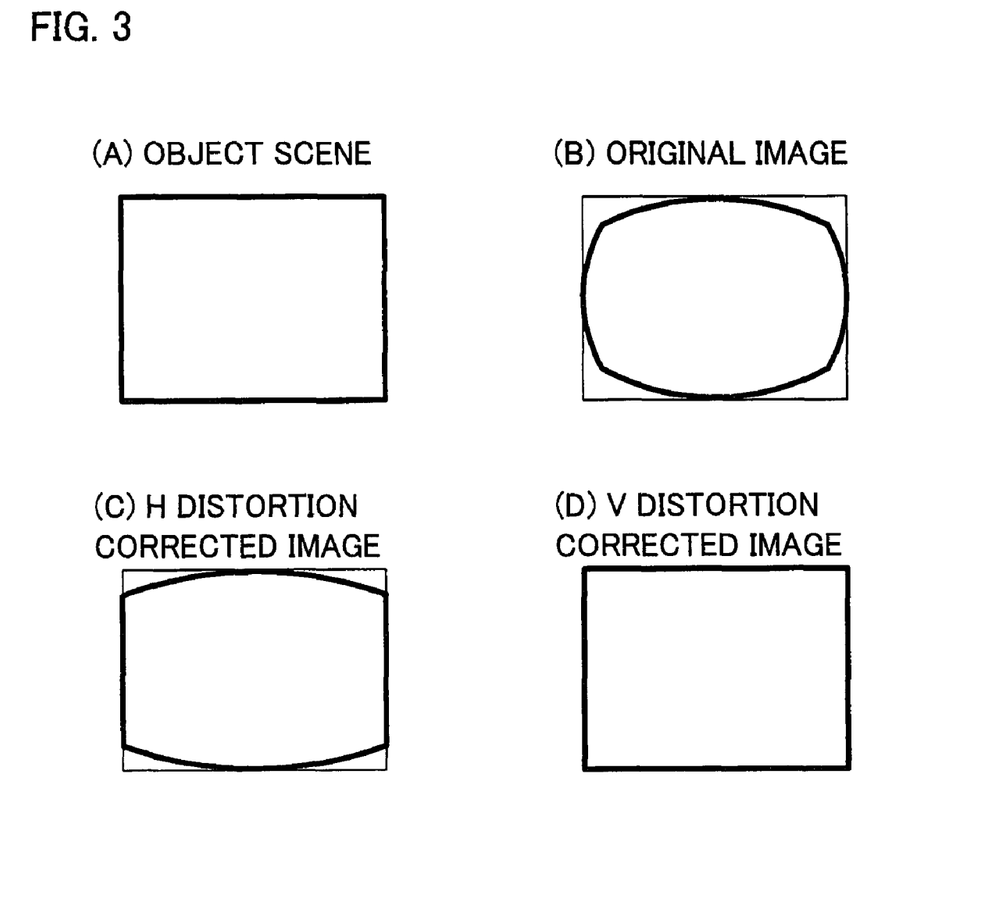
FIG. 3(A) is an illustrative view showing one example of an object scene.
FIG. 3(B) is an illustrative view showing one example of an original image outputted from an imaging device or a signal-processing circuit.
FIG. 3(C) is an illustrative view showing one example of an image on which a horizontal distortion correction is performed.
FIG. 3(D) is an illustrative view showing one example of an image on which a vertical distortion correction is performed.

When an optical image representing an object scene shown in FIG. 3(A) passes through the zoom lens 12, a barrel-shaped distortion (aberration) shown in FIG. 3(B) occurs not only in the raw image data outputted from the imaging device 14 but also in the image data outputted from the signal processing circuit 24. The horizontal-distortion correcting circuit 26 corrects the distortion in a horizontal direction out of such a distortion to thereby create image data shown in FIG. 3(C).

Figure 2:
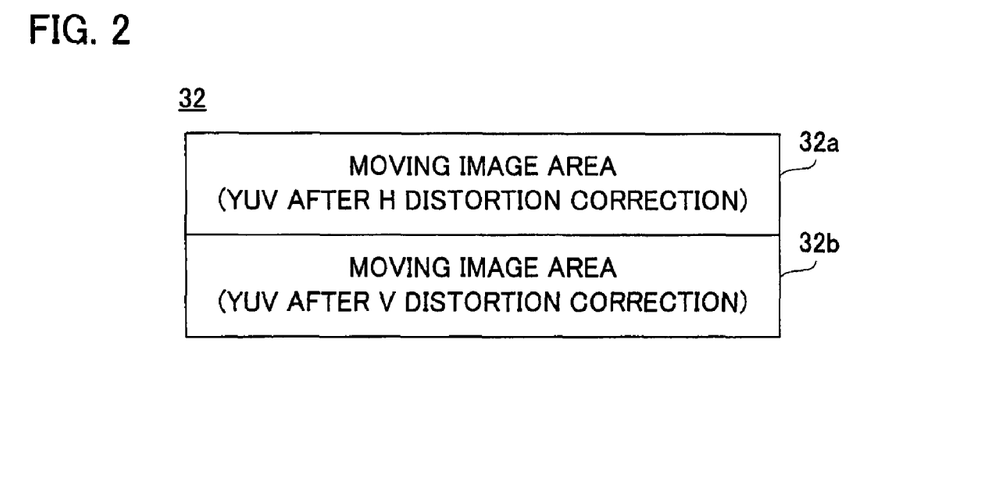
FIG. 2 is an illustrative view showing one example of a mapping state of an SDRAM applied to the embodiment in FIG. 1.

The created image data is applied to a buffer circuit 28, and thereafter, written in a moving image area 32a (see FIG. 2) of an SDRAM 32 through a memory control circuit 30. A buffer circuit 40 reads out the image data accommodated in the moving image area 32a through the memory control circuit 30. A vertical-distortion correcting circuit 42 performs a vertical distortion correction in consideration of a zoom factor at a current time point, on the image data read out by the buffer circuit 40. As a result, image data shown in FIG. 3(D) is created.

The created image data is applied to a buffer circuit 44, and thereafter, written in a moving image area 32b (see FIG. 2) of the SDRAM 32 through the memory control circuit 30. A buffer circuit 34 reads out the image data accommodated in the moving image area 32b through the memory control circuit 30, and an LCD driver 36 drives the LCD monitor 38 based on the read-out image data. As a result, a through-image having a frame rate of 30 fps is displayed on a monitor screen.

It is noted that the memory control circuit 30 executes writing and reading data to and from the SDRAM 32 in a burst access manner. Therefore, when a writing start address and a horizontal size are designated, image data having the designated horizontal size is written in addresses after the designated writing start address by a single access operation. Furthermore, when the reading start address and the horizontal size are designated, image data having the designated horizontal size is read out from addresses after the designated reading start address by a single access operation.

When a zoom operation is performed by a key input device 22, the CPU 20 applies a corresponding instruction to a driver 16. The zoom lens 12 is displaced in an optical axis direction by the driver 16 to thereby change a zoom factor of the optical image irradiated onto the imaging surface. It is noted that each of the horizontal distortion correcting circuit 26 and the vertical-distortion correcting circuit 42 executes a distortion correction in consideration of a changed zoom factor.

When a recording start operation is performed by the key input device 22, the CPU 20 starts a buffer circuit 46 and an I/F 48. The buffer circuit 46 reads out the image data accommodated in the moving image area 32b through the memory control circuit 30, and the I/F 48 writes the image data read out by the buffer circuit 46 into a moving image file formed in a recording medium 50. The reading-out operation by the buffer circuit 46 and the writing operation by the I/F 46 are ended when a recording end operation is performed by the key input device 22.

Figure 4:
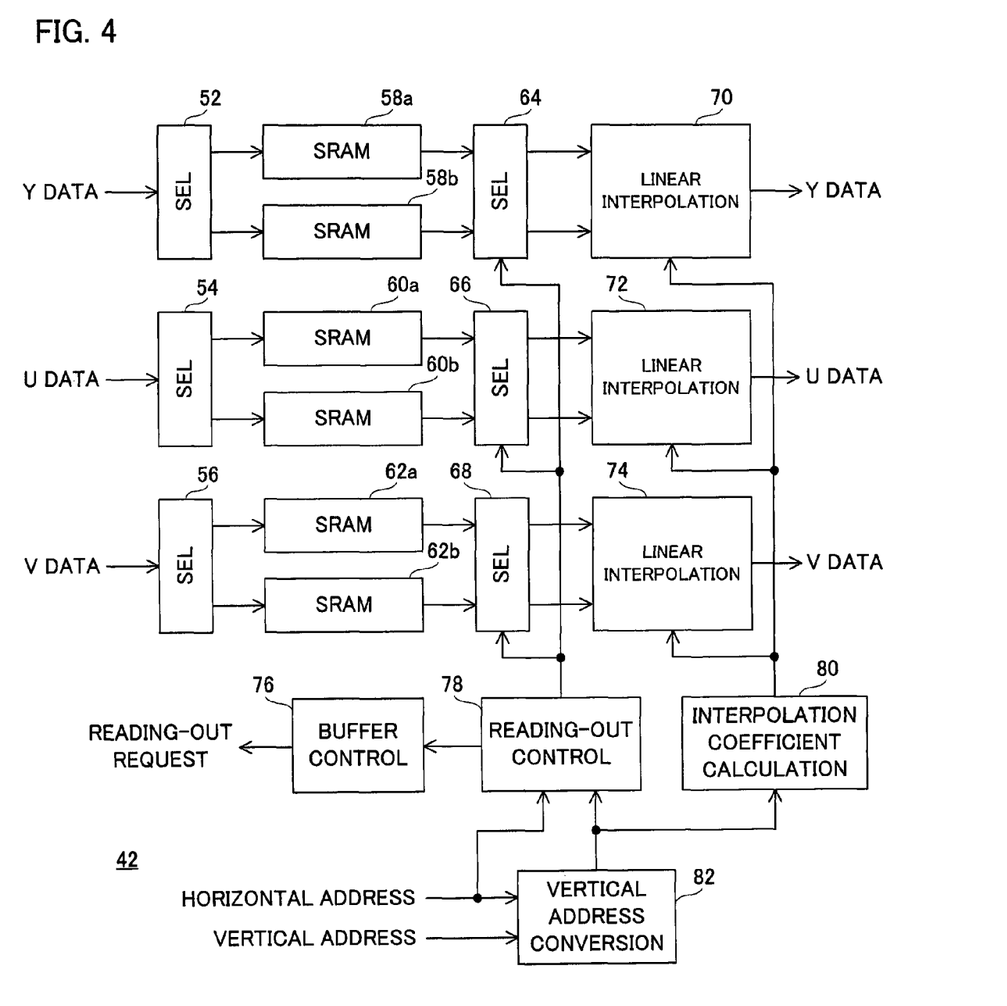
FIG. 4 is a block diagram showing one example of a configuration of a vertical-distortion correcting circuit applied to the embodiment in FIG. 1.

The vertical distortion correcting circuit 42 is configured as shown in FIG. 4. A buffer control circuit 76 issues a reading-out request in which a reading start address and a horizontal size are written, toward the buffer circuit 40. A horizontal address configuring the reading start address defines a horizontal address of a left end of a desired block out of blocks B1 to B4 shown in FIG. 7. Furthermore, the horizontal size defines a horizontal size of a desired block out of the same blocks B1 to B4. The buffer circuit 40 accesses the SDRAM 32 through the memory control circuit 30, and reads out image data belonging to the desired block in a raster scanning manner.

Out of the image data outputted from the buffer circuit 40, Y data is applied to a selector 52, U data is applied to a selector 54, and V data is applied to a selector 56. The selector 52 writes the Y data on odd-numbered lines in an SRAM 58a while writing the Y data on even-numbered lines in an SRAM 58b. The selector 54 writes the U data on odd-numbered lines in an SRAM 60a while writing the U data on even-numbered lines in an SRAM 60*b*. The selector 56 writes the V data on odd-numbered lines in an SRAM 62*a* while writing the V data on even-numbered lines in an SRAM 62*b*.

It is noted that the YUV data has a ratio of Y:U:V=4:2:2. Thus, a capacity of the SRAMs 58*a* to 58*b* is equivalent to two times a capacity of the SRAMs 60*a* to 60*b*, and a capacity of the SRAMs 60*a* to 60*b* is equal to a capacity of the SRAMs 62*a* to 62*b*.

Figure 7:
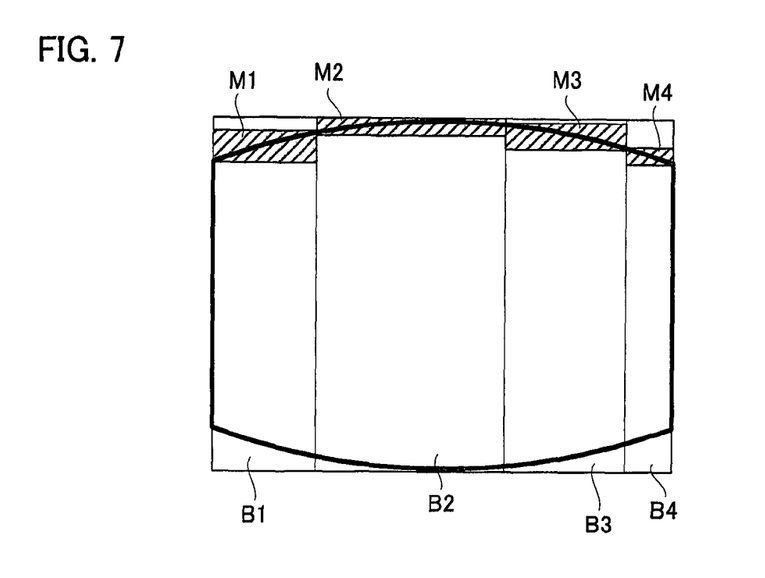
FIG. 7 is an illustrative view showing one portion of the operation of the embodiment in FIG. 4.

As understood from FIG. 7, a vertical distortion ratio of the image data changes according to the horizontal address. On the other hand, a capacity of each of the SRAMs 58*a* to 58*b* (60*a* to 60*b*, 62*a* to 62*b*) is finite. Therefore, in this embodiment the horizontal size of each of the blocks B1 to B3 is determined such that each of dimensions of areas M1 to M3 indicated by oblique lines in FIG. 7 is common and fits to the above-described SRAM capacity (or such at a capacity corresponding to each of the dimensions of the areas M1 to M3 is close to the SRAM capacity) (the dimension of the area M4 is less than the SRAM capacity). Thereby, not only an access speed of the SDRAM 32 but also a performance of the vertical distortion correction is improved.

Figure 5:
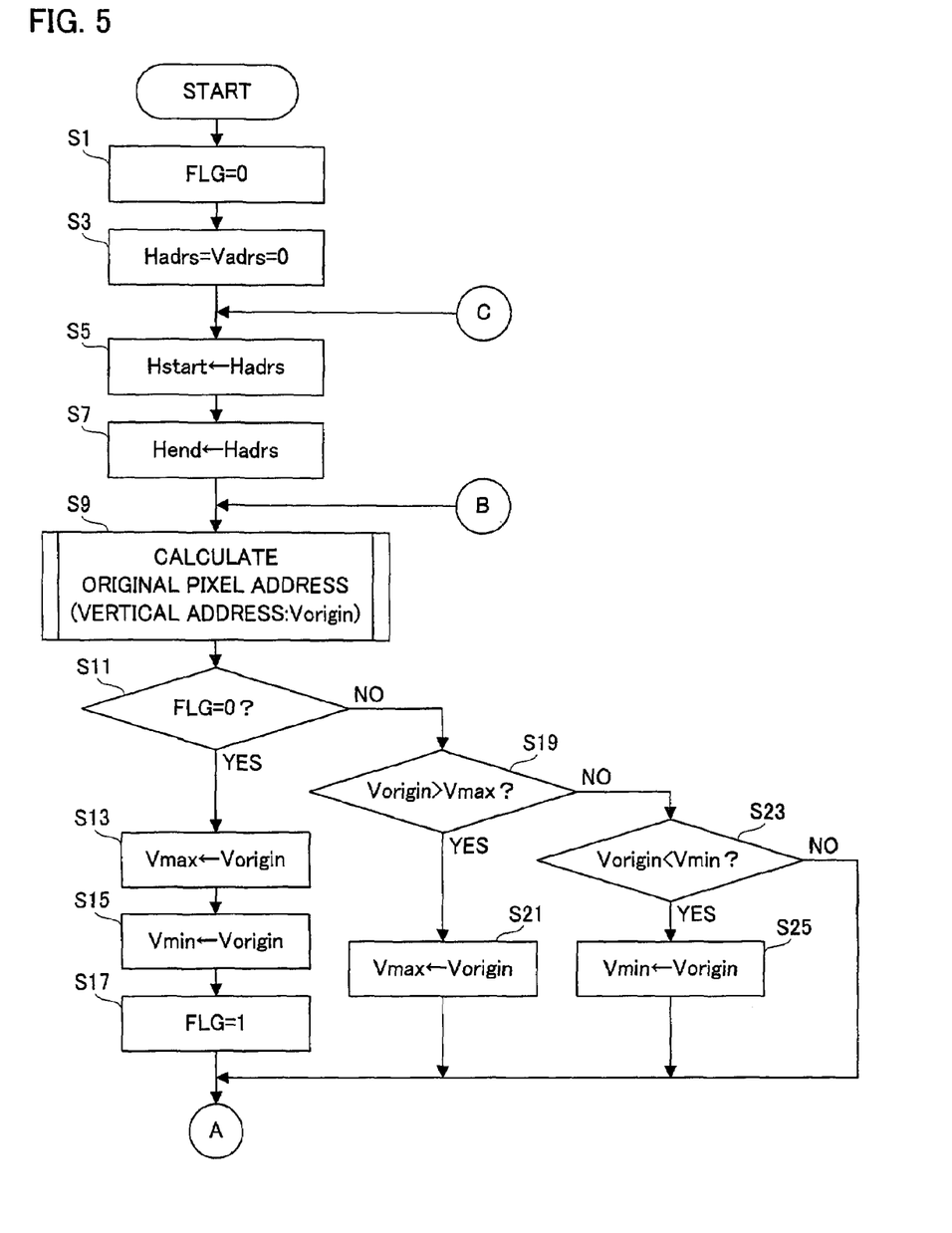
FIG. 5 is a flowchart showing one portion of an operation of a buffer control circuit applied to an embodiment in FIG. 4.
Figure 6:
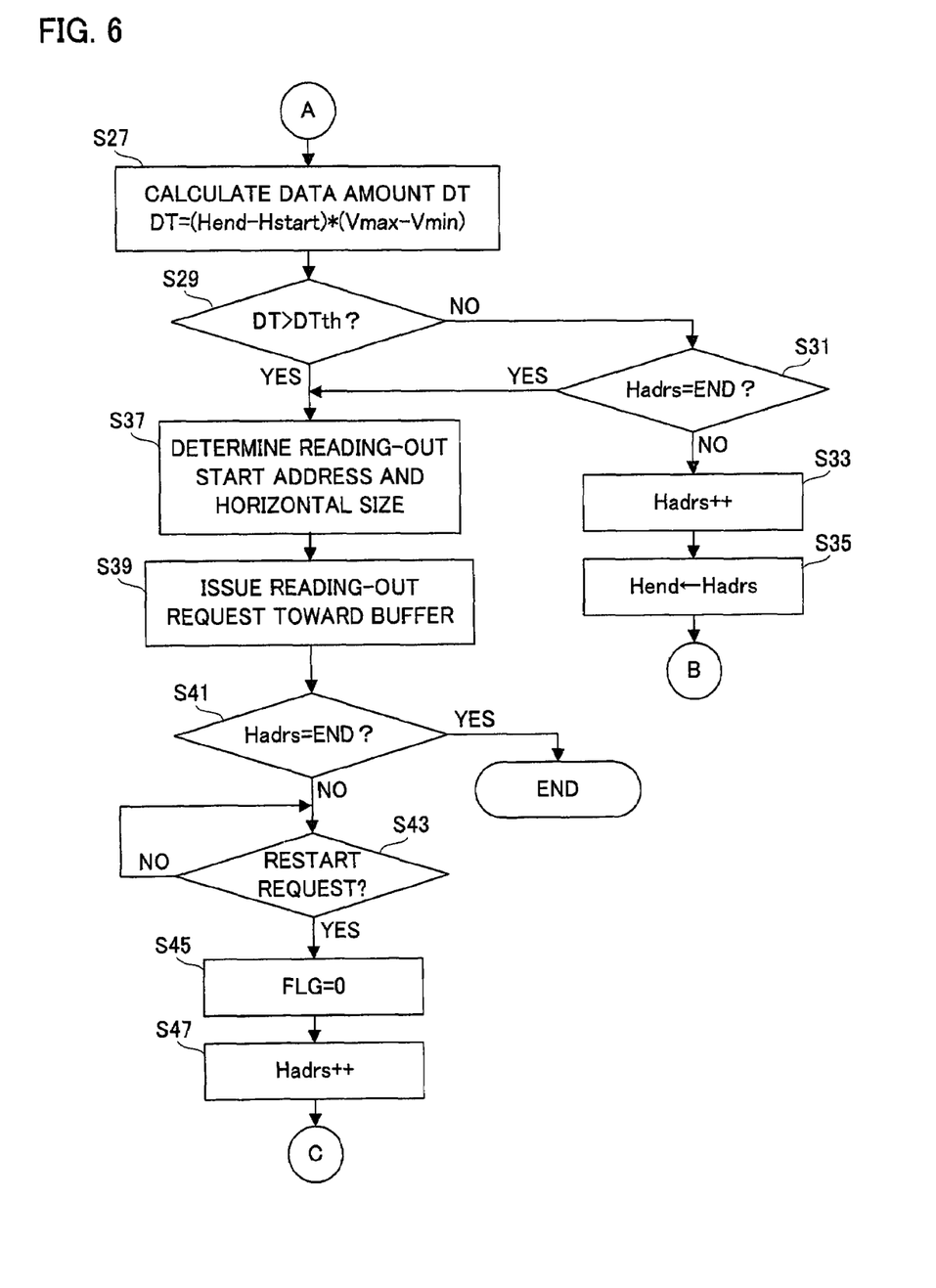
FIG. 6 is a flowchart showing another portion of the operation of the buffer control circuit applied to the embodiment in FIG. 4.

The buffer control circuit 76 calculates the reading start address and the horizontal size so as to issue a reading-out request toward the buffer control circuit 40, according to a flowchart shown in FIG. 5 to FIG. 6. A process according to this flowchart is executed each time that a vertical synchronization signal Vsync occurs.

In the description below, the image data accommodated in the moving image area 32*a* is defined as "original image data", and the image data on which the vertical distortion correction is performed is defined as "corrected image data". Furthermore, out of the blocks B1 to B4 shown in FIG. 7, a block to be noticed is defined as a "noticed block", a pixel to be noticed on the corrected image data belonging to the noticed block is defined as a "noticed pixel", and a pixel on the original image data required to create the noticed pixel is defined as an "original pixel".

It is noted that as described later, the noticed pixel can be obtained by performing an interpolation arithmetic operation on two adjacent pixels in the vertical direction on the original image data, and is placed at an appropriate position (position at which the vertical distortion is cancelled out) on the corrected image data. The original pixel is equivalent to the lower pixel of the two pixels on which the interpolation arithmetic operation is performed.

With reference to FIG. 5, a flag FLG is firstly set to "0" in a step S1, and variables Hadrs and Vadrs are set to "0" in a step S3. In a step S5, the variable Hadrs is set to a variable Hstart, and in a step S7, the variable Hadrs is set to a variable Hend.

The variables Hadrs and Vadrs are those which represent a horizontal address and a vertical address of the noticed pixel, respectively, and the variables Hstart and Hend are those which represent a horizontal address of the left end of the noticed block and a horizontal address of the right end of the noticed block, respectively.

In a step S9, a vertical address of the original pixel is calculated. The calculated vertical address is set to a variable Vorign. In a step S11, it is determined whether or not the flag FLG is "0". When YES is determined in this step, the variable Vorigin is set to a variable Vmax in a step S13 and to a variable Vmin in a step S15, and the flag FLG is set to "1" in a step S17, and thereafter, the process advances to a step S27.

On the other hand, when NO in the step S11, it is determined whether or not the variable Vorigin exceeds the variable Vmax in a step S19, and it is determined whether or not the variable Vorigin falls below the variable Vmin in a step S23. When YES is determined in the step S19, the variable Vorigin is set to the variable Vmax in a step S21, and then, the process advances to the step S27. When YES in the step S23, the variable Vorigin is set to the variable Vmin in a step S25, and then, the process advances to the step S27.

In the step S27, a data amount DT is calculated according to an equation 1.

$$DT=(Hend-Hstart) \times (Vmax-Vmin) \quad \text{Equation 1}$$

In a step S29, it is determined whether or not the data amount DT exceeds a threshold value DTth corresponding to the above-described SRAM capacity, and in a step S31, it is determined whether or not the variable Hadrs is equal to a constant END (=639). When NO in both of the steps S29 and S31, the variable Hadrs is incremented in a step S33, the variable Hadrs is set to the variable Hend in a step S35, and then, the process returns to the step S9. On the other hand, when YES in the step S29 or S31, the process advances to processes after a step S37.

In the step S37, a reading-out start address and a horizontal size are determined. The reading-out start size is defined by (Hstart Vmax), and the horizontal size is defined by "Hend-Hstart". In a step S39, a reading-out request in which the determined reading-out start address and horizontal size are written is issued toward the buffer circuit 40.

In a step S41, a determination process similar to that in the step S31 is executed, and when YES, the process is ended while when NO, a start request from a reading-out control circuit 78 is waited in a step S43. When the restart request is issued, the flag FLG is set to "0" in a step S45, the variable Hadrs is incremented in a step S47, and then, the process returns to the step S5. It is noted that the restart request is issued at a timing at which the horizontal address of the pixel read out from the SRAMs 58*a* to 62*b* for the interpolation arithmetic operation reaches "Hend".

Figure 8:
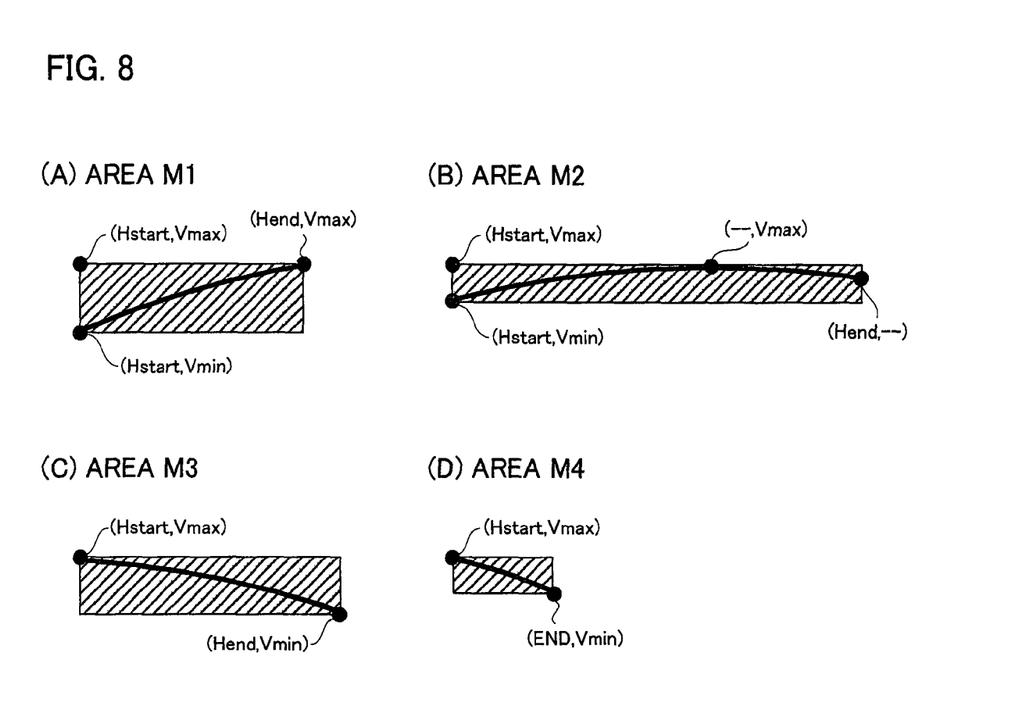
FIG. 8(A) is an illustrative view showing one portion of the operation of the embodiment in FIG. 4, which corresponds to an area M1 shown in FIG. 7.
FIG. 8(B) is an illustrative view showing one portion of the operation of the embodiment in FIG. 4, which corresponds to an area M2 shown in FIG. 7.
FIG. 8(C) is an illustrative view showing one portion of the operation of the embodiment in FIG. 4, which corresponds to an area M3 shown in FIG. 7.
FIG. 8(D) is an illustrative view showing one portion of the operation of the embodiment in FIG. 4, which corresponds to an area M4 shown in FIG. 7.

When a determination result in the step S29 in a first loop indicates YES, the area M1 is finalized in a manner shown in FIG. 8(A), and when a determination result in the step S29 in a second loop indicates YES, the area M2 is finalized in a manner shown in FIG. 8(B). Furthermore, when a determination result in the step S29 in a third loop indicates YES, the area M3 in finalized in a manner shown in FIG. 8(C), and when a determination result in the step S31 in a fourth loop indicates YES, the area M4 is finalized in a manner shown in FIG. 8(D).

Figure 9:
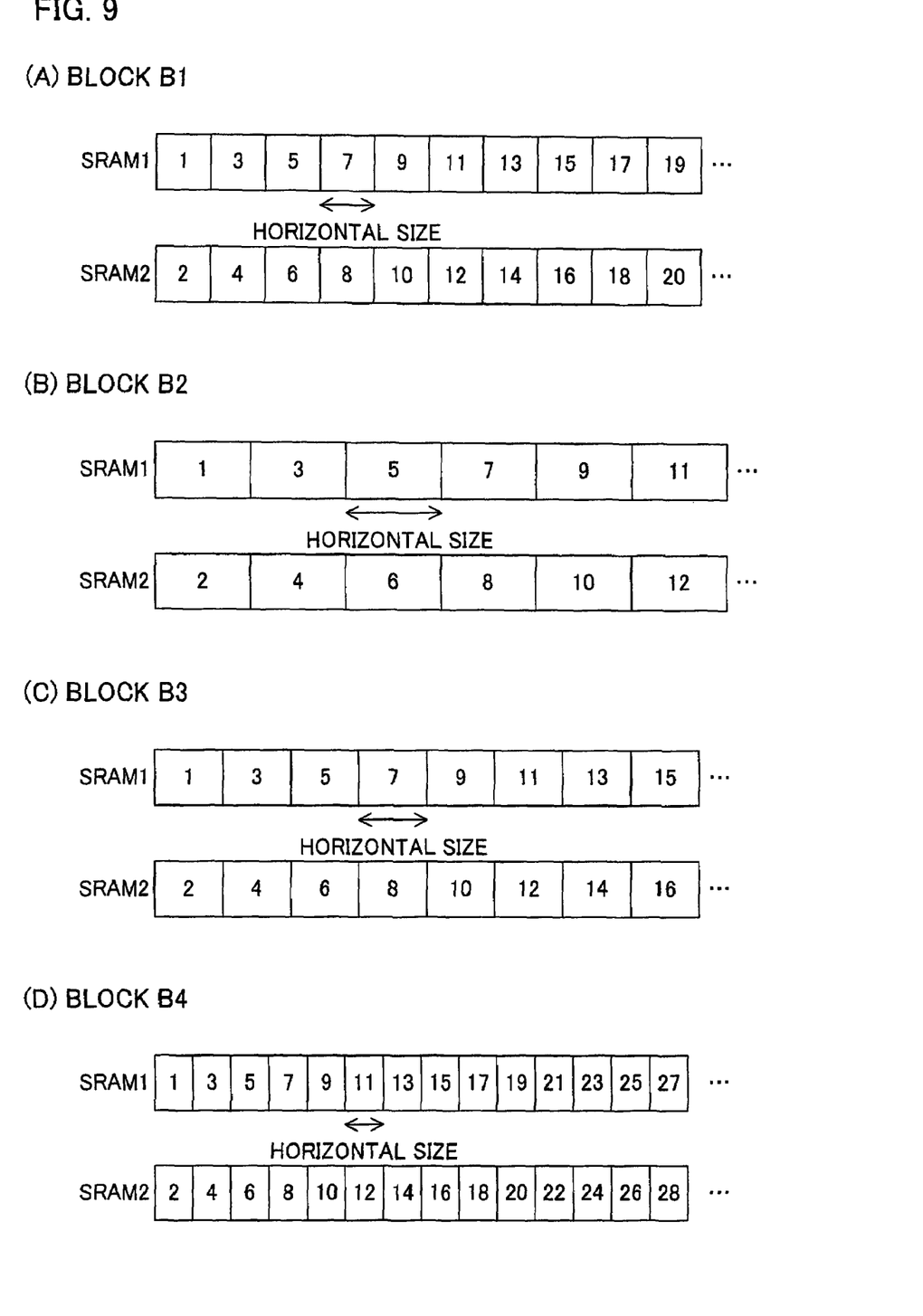
FIG. 9(A) is an illustrative view showing another portion of the operation of the embodiment in FIG. 4, which corresponds to a block B1 shown in FIG. 7.
FIG. 9(B) is an illustrative view showing another portion of the operation of the embodiment in FIG. 4, which corresponds to a block B2 shown in FIG. 7.
FIG. 9(C) is an illustrative view showing another portion of the operation of the embodiment in FIG. 4, which corresponds to a block B3 shown in FIG. 7.
FIG. 9(D) is an illustrative view showing another portion of the operation of the embodiment in FIG. 4, which corresponds to a block B4 shown in FIG. 7.

Additionally, the image data of each line read out from the block B1 is written in an SRAM1 (58*a*, 60*a*, 62*a*) and an SRAM2 (58*b*, 60*b*, 62*b*) in a manner shown in FIG. 9(A), the image data of each line read out from the block B2 is written in the SRAM1 and the SRAM2 in a manner shown in FIG. 9(B). Similarly, the image data of each line read out from the block B3 is written in the SRAM1 and the SRAM2 in a manner shown in FIG. 9(C), and the image data of each line read out from the block B4 is written in the SRAM1 and the SRAM2 in a manner shown in FIG. 9(D). It is noted that numbers shown in FIG. 9(A) to FIG. 9(D) represent line numbers.

Figure 10:
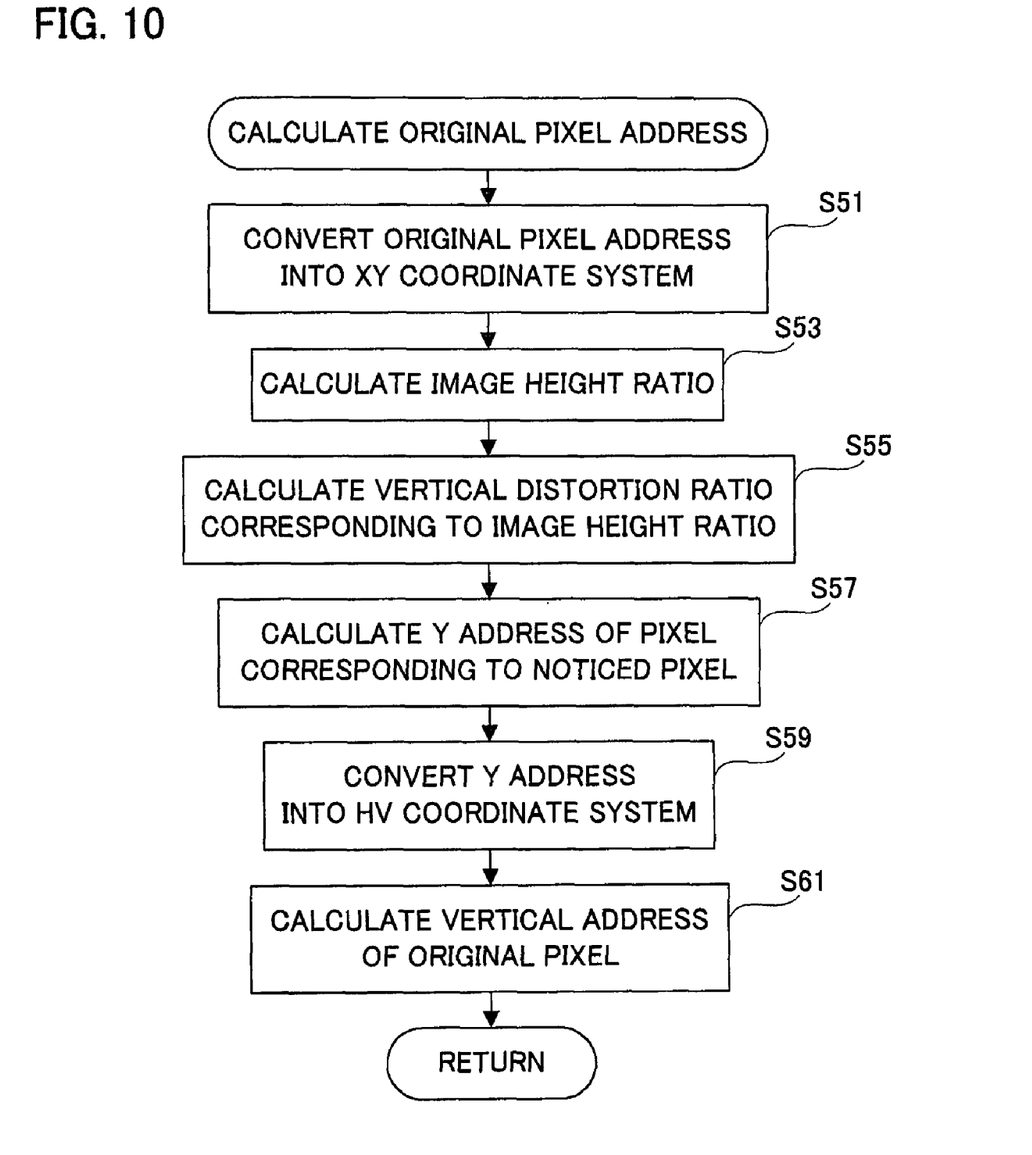
FIG. 10 is a flowchart showing still another portion of the operation of the buffer control circuit applied to the embodiment in FIG. 4.
Figure 11:
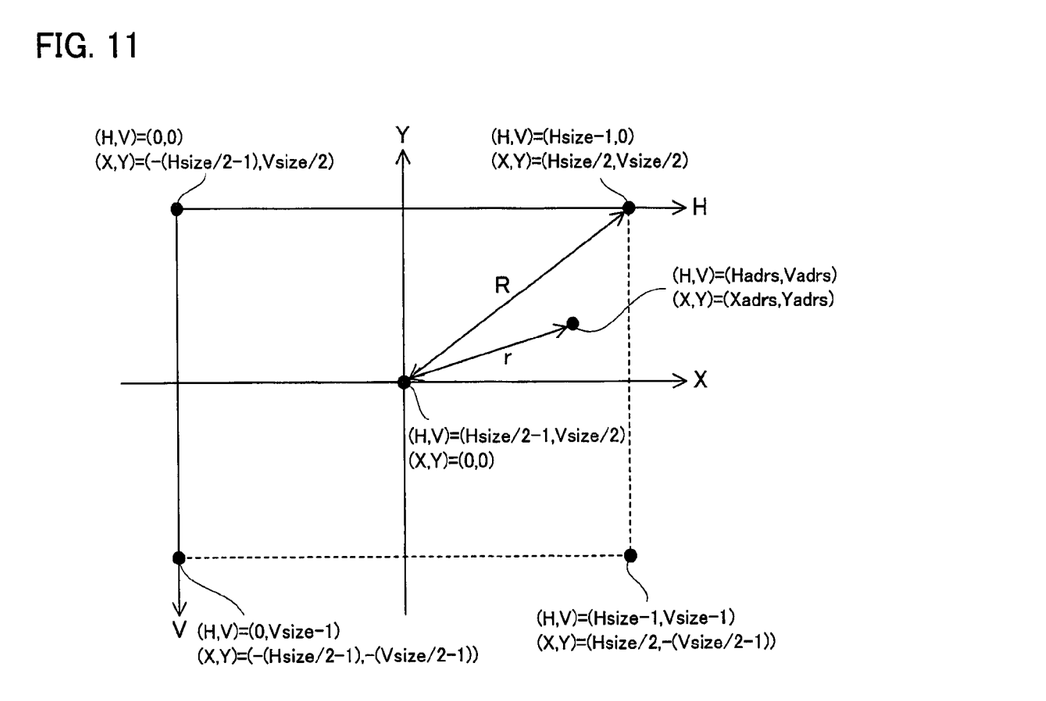
FIG. 11 is an illustrative view showing a relationship between an HV coordinate system and an XY coordinate system.

The process in the step S9 shown in FIG. 5 is executed according to a subroutine shown in FIG. 10. In a step S51, an address of the noticed pixel is converted from an HV coordinate system to an XY coordinate system according to an equation 2. In a step S53, an image height ratio of the noticed pixel is calculated according to an equation 3. With reference to FIG. 11, a pixel position on the image data is specified by utilizing the HV coordinate system in which an upper left vertex angle of the object scene image is used as an origin point. On the contrary thereto, the image height ratio is calculated by utilizing the XY coordinate system in which a center of the zoom lens 12, i.e., a center of the object scene image, is used as an origin point. Therefore, the address of the noticed pixel is converted from the HV coordinate system to the XY coordinate system, and then, the image height ratio is calculated.

$$Xadrs = Hadrs - Hsize/2$$

$$Yadrs = Vadrs - Vsize/2 \quad \text{Equation 2}$$

Xadrs: X address of the noticed pixel
Yadrs: Y address of the noticed pixel
Hsize: horizontal size of the object scene image
Vsize: vertical size of the object scene image $$r = \sqrt{\{Xadrs^2 + Yadrs^2\}}$$

$$R = \sqrt{\{(Hsize/2)^3 + (Vsize/2)^2\}}$$

$$RD = r/R \quad \text{Equation 3}$$

RD: image height ratio

Figure 12:
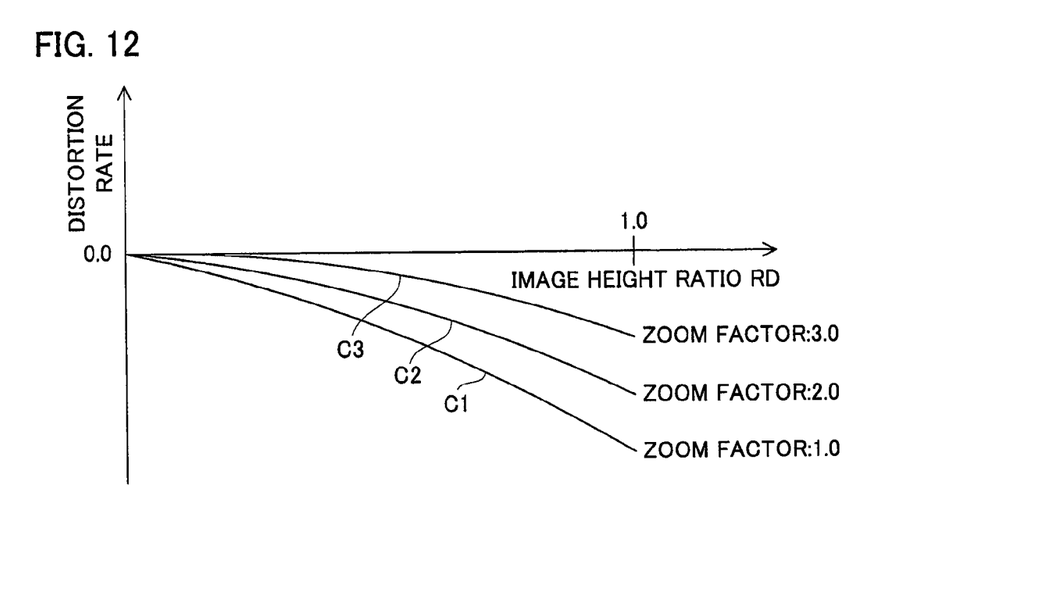
FIG. 12 is a graph showing one example of a relationship between an image height ratio and a distortion ratio.

In a step S55, a vertical distortion ratio corresponding to the image height ratio obtained in the step S53 is calculated with reference to curves C1 to C3 shown in FIG. 12. The curve C1 shows a relationship between a vertical distortion ratio and an image height ratio, corresponding to a zoom factor of 1.0; the curve C2 shows a relationship between a vertical distortion ratio and an image height ratio, corresponding to a zoom factor of 2.0; and the curve C3 shows a relationship between a vertical distortion ratio and an image height ratio, corresponding to a zoom factor of 3.0. With respect to all the curves C1 to C3, the vertical distortion ratio indicates "0.0" when the image height ratio is "0.0", and decreases as the image height ratio increases. In the step S55, an approximate equation of a curve corresponding to a zoom factor at a current time point is created based on these curves C1 to C3, and the vertical distortion ratio is calculated with reference to the created approximate equation.

In a step S57, with reference to the Y address of the noticed pixel and the vertical distortion ratio obtained in the steps S51 and S55, respectively, a Y address of a pixel on the original image data corresponding to the noticed pixel is calculated. More specifically, an arithmetic operation according to an equation 4 is executed.

$$Ycvt = Yadrs*(1+\beta)*K \quad \text{Equation 4}$$

Ycvt: Y address of the pixel corresponding to the noticed pixel
β: vertical distortion ratio of the noticed pixel
K: constant In a step S59, the Y address obtained in the step S57 is converted into a vertical address in the HV coordinate system according to an equation 5. Furthermore, in a step S61, an arithmetic operation according to an equation 6 is performed on the converted vertical address so as to calculate a vertical address of the original pixel.

$$Vcvt = Ycvt + Vsize/2 \quad \text{Equation 5}$$

Vcvt: vertical address of the pixel corresponding to the noticed pixel $$Vorign = int(Vcvt) + 1 \quad \text{Equation 6}$$

int (Vcvt): integer part of Vcvt
Vorign: vertical address of the original pixel

Returning to FIG. 4, the horizontal address and the vertical address of the pixel data to be inputted to the selectors 52 to 56 are applied to a vertical-address converting circuit 82 from the buffer circuit 40. Furthermore, only the horizontal address out of the same horizontal address and vertical address is applied to a reading-out control circuit 78.

The vertical-address converting circuit 82 calculates the vertical address of the original pixel in the same manner as the process shown in FIG. 10, and applies the calculated vertical address and a vertical address of which the value is smaller by one than the calculated vertical address to each of the reading-out control circuit 78 and the interpolation coefficient calculating circuit 80.

The reading-out control circuit 78 specifies two pixels defined by the two vertical addresses applied from the vertical-address converting circuit 82 and the horizontal address applied from the buffer circuit 40, and requests selectors 64, 66, and 68 to read out the specified two pixels.

The selector 64 reads out the Y data of the requested two pixels from the SRAMs 58a and 58b, and applies the Y data of the read-out two pixels to a linear interpolation circuit 70. The selector 66 reads out the U data of the requested two pixels from the SRAMs 60a and 60b, and applies the U data of the readout two pixels to a linear interpolation circuit 72. The selector 68 reads out the V data of the requested two pixels from the SRAMs 62a and 62b, and applies the V data of the read-out two pixels to a linear interpolation circuit 74.

The interpolation coefficient calculating circuit 80 calculates a vertical interpolation coefficient based on the two vertical addresses applied from the vertical-address converting circuit 82, and applies the calculated vertical interpolation coefficient to each of the linear interpolation circuits 70 to 74.

Figure 13:
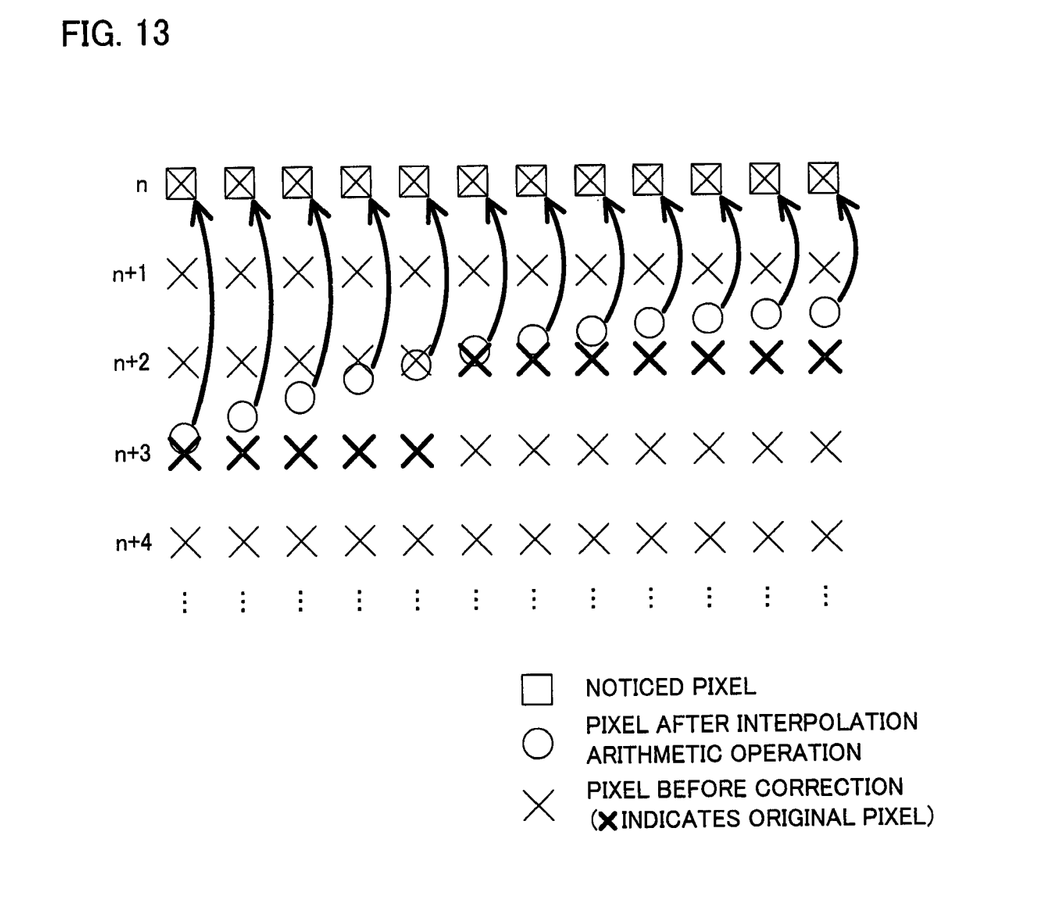
FIG. 13 is an illustrative view showing one portion of the operation of the embodiment in FIG. 4.

The linear interpolation circuit 70 performs a vertical interpolation arithmetic operation according to the vertical interpolation coefficient applied from the interpolation coefficient calculating circuit 80, on the Y data of the two pixels applied from the selector 64. Furthermore, the linear interpolation circuit 72 performs a vertical interpolation arithmetic operation according to the vertical interpolation coefficient applied from the interpolation coefficient calculating circuit 80, on the U data of the two pixels applied from the selector 66. In addition, the linear interpolation circuit 74 performs a vertical interpolation arithmetic operation according to the vertical interpolation coefficient applied from the interpolation coefficient calculating circuit 80, on the V data of the two pixels applied from the selector 68. The pixels on which the vertical interpolation is performed are placed at positions shown in FIG. 13. The corrected image data thus obtained is outputted toward the buffer circuit 44.

As understood from the above description, the buffer circuit 28 writes the image data having horizontal pixels of a first number (=640) and a vertical distortion different depending on a horizontal pixel position (horizontal address), in the SDRAM 32. The buffer circuit 40 reads out the image data accommodated in the SDRAM 32 for each units of horizontal pixels which include a reference horizontal pixel (the pixel of the horizontal address defining the reading-out start address) and which are of a second number (=horizontal size of the blocks B1 to B4) smaller than the first number, in a vertical pixel direction. The image data read out by the buffer circuit 40 is subjected to a vertical distortion correction by the vertical-distortion correcting circuit 42. The buffer control circuit 76 determines the second number in such a manner as to indicate a larger numerical value as the vertical distortion corresponding to the reference horizontal pixel is smaller, and starts the buffer circuit 40 (S37). Also, the buffer control circuit 76 changes the position of the reference horizontal pixel to a position corresponding to the second number at a timing based on a correction amount by the vertical-distortion correcting circuit 42, and starts the above-described determination process (S37) (S47).

Thus, the second number noticed by the buffer circuit 40 indicates a larger numerical value as the vertical distortion corresponding to the reference horizontal pixel is smaller. Furthermore, the position of the reference horizontal pixel is changed to the position corresponding to the second number at a timing based on the connection amount by the vertical-distortion correcting circuit 42. Thereby, a reading-out operation in consideration of the change of the vertical distortion in the horizontal pixel direction is realized, and as a result, the performance of the vertical distortion correction is improved.

It is noted that in this embodiment, the distortion correction on a moving image is assumed. However, the distortion correction may be executed on a still image.

Although the present invention has been described and illustrated in detail it is clearly understood that the same is by way of illustration and example only and is not to be taken by way of limitation, the spirit and scope of the present invention being limited only by the terms of the appended claims.

What is claimed is:

1. A distortion correcting apparatus, comprising:
    a writer which writes image data having horizontal pixels of a first number and a vertical distortion different depending on a horizontal pixel position, into a memory;
    a reader which reads out the image data accommodated in said memory by said writer for each unit of horizontal pixels, which include a reference horizontal pixel and are of a second number smaller than the first number, in a vertical pixel direction;
    a corrector which performs a vertical distortion correction on the image data read out by said reader;
    a determiner which determines a value of the second number so that the value indicates a larger numerical value as a vertical distortion corresponding to the reference horizontal pixel is smaller, and thereafter starts said reader; and
    a changer which changes a position of the reference horizontal pixel to a position corresponding to the second number at a timing based on a correction amount of said corrector, and thereafter starts said determiner.

2. A distortion correcting apparatus according to claim 1, wherein said corrector includes a temporary memory which temporally holds the image data, and said determiner determines a numerical value indicated by the second number by referring to a capacity of said temporary memory.

3. A distortion correcting apparatus according to claim 1, further comprising:
    a designator which designates a plurality of horizontal pixel positions by referring to the reference horizontal pixel;
    a specifier which specifies a plurality of vertical pixel positions respectively corresponding to the plurality of horizontal pixel positions designated by said designator by referring to the vertical distortion; and
    a calculator which calculates a data amount of image data belonging to a partial area defined by the plurality of horizontal pixel positions designated by said designator and the plurality of vertical pixel positions specified by said specifier, wherein said determiner determines a numerical value indicated by the second number based on the data amount calculated by said calculator.

4. A distortion correcting apparatus according to claim 3, wherein one of the plurality of horizontal pixel positions corresponds to the reference horizontal pixel, and said designator includes a changer which changes another one of the plurality of horizontal pixel positions when the data amount calculated by said calculator is equal to or less than a threshold value.

5. A distortion correcting apparatus according to claim 4, wherein said determiner determines, as the second number, a numerical value equivalent to a gap among the plurality of horizontal pixel positions when the data amount calculated by said calculator exceeds the threshold value.

6. A distortion correcting apparatus according to claim 4, wherein said corrector includes a temporary memory which has a capacity corresponding to the threshold value and which temporarily holds the image data.

7. A distortion correcting apparatus according to claim 1, wherein said reader performs a reading-out operation in a burst access manner, and the second number is equivalent to one burst access amount.

* * * * *